(12) United States Patent
Phang et al.

(10) Patent No.: US 9,060,243 B2
(45) Date of Patent: Jun. 16, 2015

(54) METHOD AND APPARATUS FOR EXTENDING COVERAGE IN A WIRELESS COMMUNICATION SYSTEM

(71) Applicant: MOTOROLA SOLUTIONS, INC, Schaumburg, IL (US)

(72) Inventors: Wayne M Phang, Coral Springs, FL (US); Shakeeb Z Khan, Miramar, FL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 128 days.

(21) Appl. No.: 13/967,496

(22) Filed: Aug. 15, 2013

(65) Prior Publication Data

US 2015/0050884 A1 Feb. 19, 2015

(51) Int. Cl.
*H04B 7/00* (2006.01)
*H04W 4/00* (2009.01)
*H04W 88/06* (2009.01)

(52) U.S. Cl.
CPC .............. *H04W 4/008* (2013.01); *H04W 88/06* (2013.01)

(58) Field of Classification Search
CPC ..... H04W 4/008; H04W 84/18; H04W 88/04; H04W 88/06
USPC ......... 455/41.2, 509, 11.1, 518, 552.1, 67.11, 455/63.1
See application file for complete search history.

(56) References Cited

U.S. PATENT DOCUMENTS

| 6,694,125 | B2 | 2/2004 | White et al. |
| 6,771,933 | B1 | 8/2004 | Eng et al. |
| 6,968,153 | B1 | 11/2005 | Heinonen et al. |
| 6,983,162 | B2 | 1/2006 | Garani et al. |
| 7,596,194 | B2 * | 9/2009 | Janky ............................ 375/346 |
| 7,613,425 | B2 | 11/2009 | Tailor |
| 7,787,408 | B2 | 8/2010 | Proctor, Jr. et al. |
| 8,169,983 | B2 * | 5/2012 | Janky et al. .................... 370/338 |
| 8,223,879 | B2 | 7/2012 | Morris |
| 8,279,868 | B2 * | 10/2012 | Martinez et al. .............. 370/392 |

(Continued)

FOREIGN PATENT DOCUMENTS

| CN | 100521644 C | 7/2009 |
| JP | 04927943 B2 | 5/2012 |
| WO | 0050971 A2 | 8/2000 |

OTHER PUBLICATIONS

PCT International Search Report dated Sep. 19, 2014 for counterpart application PCT/US2014/048343.

*Primary Examiner* — Marceau Milord
(74) *Attorney, Agent, or Firm* — Daniel R. Bestor

(57) ABSTRACT

A first radio receives, via a land mobile radio (LMR) radio frequency transceiver, a first transmission of an LMR call from a source transmitting radio transmitted on a first LMR frequency for re-transmission to one or more destination radios. The first radio measures a first measured signal level of the first transmission and receives, via a first short-range RF transceiver from a second radio, a second measured signal level of the first transmission as measured by the second radio. The first radio compares the first measured signal level and the second measured signal level and determines, based on the comparing, how the LMR call should be routed from the source transmitting radio to the one or more destination radios via the first and second radios. The first radio then transmits, via the first short-range RF transceiver, a corresponding instruction indicating a result of the determining to the second radio.

20 Claims, 6 Drawing Sheets

(56) References Cited

U.S. PATENT DOCUMENTS

| | | |
|---|---|---|
| 8,320,825 B2 | 11/2012 | Goransson et al. |
| 8,325,758 B2 | 12/2012 | Feuerstraeter et al. |
| 8,325,785 B2 | 12/2012 | Rofougaran et al. |
| 8,559,380 B2 * | 10/2013 | Dewasurendra et al. ..... 370/329 |
| 8,565,145 B2 * | 10/2013 | Khan et al. .................... 370/315 |
| 8,879,980 B2 * | 11/2014 | Bienas et al. ..................... 455/9 |
| 8,891,497 B1 * | 11/2014 | Vleugels ....................... 370/338 |
| 2003/0185163 A1 | 10/2003 | Bertonis et al. |
| 2006/0003700 A1 * | 1/2006 | Yasuda et al. ................ 455/41.2 |
| 2006/0223561 A1 | 10/2006 | Capece et al. |
| 2007/0141987 A1 * | 6/2007 | Weinans et al. .............. 455/41.2 |
| 2010/0214930 A1 | 8/2010 | Hu et al. |
| 2010/0322287 A1 * | 12/2010 | Truong et al. ................. 375/133 |
| 2012/0282961 A1 | 11/2012 | Bienas et al. |
| 2014/0194062 A1 * | 7/2014 | Palin et al. ................... 455/41.2 |

* cited by examiner

METHOD AND APPARATUS FOR EXTENDING COVERAGE IN A WIRELESS COMMUNICATION SYSTEM

BACKGROUND OF THE INVENTION

Mobile or portable user terminals may operate on a narrowband system, for example, a Land Mobile Radio (LMR) system. These mobile or portable user terminals include mobile radios, portable radios or other similar voice communication entities that communicate with one another via wired and/or wireless networks. The mobile or portable user terminals (collectively referred to as radios) may operate in areas where there is inconsistent coverage or in areas where there are dead spots (i.e., no coverage) in specific locations. For example, radios that are otherwise operable in a building may be inoperable in the basement of the building with concrete floors because the concrete floors may block or restrict radio frequency (RF) signals being transmitted to or from the radios. In another example, the radios that are otherwise operable in a restaurant may be inoperable in a metal stockroom or storage cage in a kitchen of the restaurant because the metal may block the RF signals being transmitted to and from the radios.

In addition, the radios may operate on different portions of an RF spectrum, wherein certain licensed portions of the RF spectrum may be subject to increased interference. When there is interference on a frequency being used by a sending radio that is operating in a repeater system (i.e., a system where a signal is sent from the sending radio to a repeater and then forwarded from the repeater to one or more receiving radios), the sending radio is typically unable to switch to another frequency with less interference because a duplexer in the repeater is typically tuned at a manufacturing site to a fixed frequency for sending signals from the repeater and to another fixed frequency for receiving signals at the repeater. Therefore, there is a need for a frequency agile system where the radios can be dynamically configured to communicate on different frequencies. In addition, although the duplexer enables the repeater to simultaneously receive and transmit signals, duplexers are relatively bulky and costly devices.

Furthermore, the radios used by public safety agencies, for example, emergency first responder organizations such as police or fire departments, or public works organizations, may operate according to different proprietary protocols or may operate on different RF bands. For example, a police department may operate according to a first proprietary protocol and a fire department may operate according to a second proprietary protocol. Using this example, when an incident, such as a fire, accident or other public safety emergency occurs, the radios operating on the first protocol may be unable to communicate with the radios operating on the second protocol. In addition, radios used in a first communication system operating on a first RF band may be unable to communicate with radios used in a second communication system operating on a second RF band. For example, the radios in a firefighter communication system may operate in the Very High Frequency (VHF) band and radios in a medical communication system may operate in the Ultra High Frequency (UHF) band. Therefore, the radios in the firefighter communication system may be unable to communicate with the radios in the medical communication system.

Accordingly, there is a need for an improved method and apparatus for enabling radios to communicate, regardless of the protocol or the band on which the radios operate, and thereby extend coverage in a wireless communication system.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
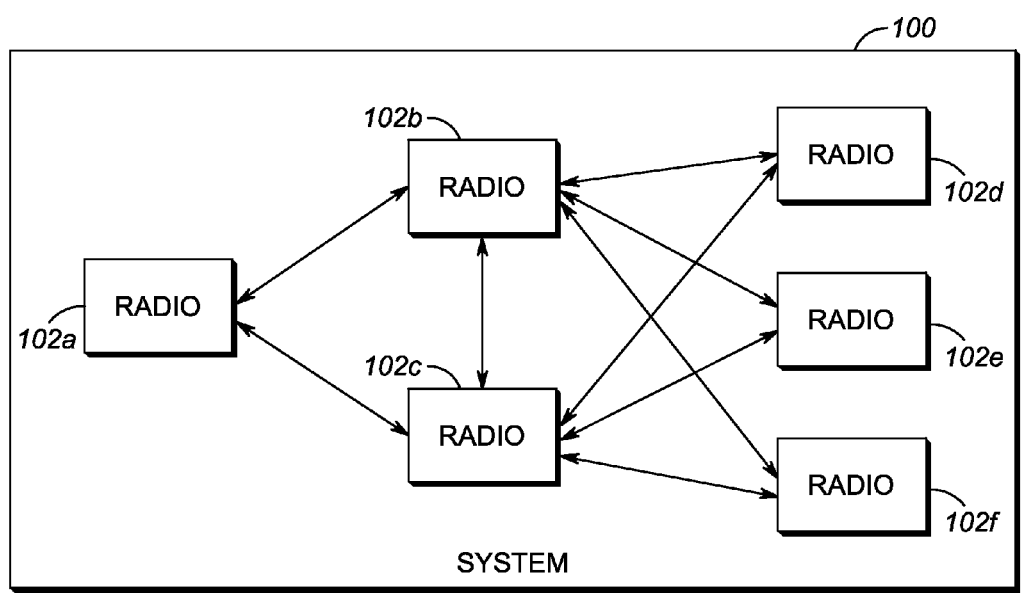
FIG. 1 is a block diagram of a system used in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Some embodiments are directed to methods and apparatuses for receiving, via a first land mobile radio (LMR) radio frequency (RF) transceiver at a first short-range paired radio, a first transmission of an LMR call from a source transmitting radio. The LMR call is transmitted from the source transmitting radio on a first LMR frequency for re-transmission to one or more destination radios. The first short-ranged paired radio measures a first measured signal level of the first transmission transmitted by the source transmitting radio. The first short-ranged paired radio receives, via a first short-range RF transceiver and from a second short-range paired radio, a second measured signal level of the first transmission transmitted by the source transmitting radio as measured by the second short-range paired radio. The first short-ranged paired radio compares the first measured signal level and the second measured signal level and determines, based on the comparing, how the LMR call should be routed from the source transmitting radio to the one or more destination radios via the first and second short-range paired radios. The first short-ranged paired radio then transmits, via the first short-range RF transceiver, a corresponding instruction indicating a result of the determining to the second short-range paired radio.

FIG. 1 is a block diagram of a system used in accordance with some embodiments. System 100 includes radios 102 (i.e., radios 102a-102f), each of which may operate according to a wireless access network (WAN) protocol. Non-limiting examples of WAN network protocols that may be used by a system on which radios 102 operate may include a Land Mobile Radio (LMR) protocol, a Project 25 (P25) protocol, a Long Term Evolution (LTE) protocol, a Code Division Multiple Access (CDMA) protocol, a Universal Mobile Telecommunication System (UMTS) protocol, or any IEEE 802.11 protocol. Radios 102 may be, for example, portable narrowband two-way radios, mobile radios or other similar mobile devices that communicate with one another via wired and/or wireless networks. Each radio 102 may include one or more local area network or personal area network transceivers such as a Wi-Fi transceiver, perhaps operating in accordance with an IEEE 802.11 standard (e.g., 802.11a, 802.11b, 802.11g), an IEEE 802.15 standard, a 3GPP ProSe standard, a Land Mobile Radio Direct Mode standard, or a Bluetooth transceiver, for radio to radio communications. This enables radios 102 to communicate with each other without the support of an infrastructure-based network. Therefore, when the radios 102 are in an area with limited or inconsistent network coverage, the radios 102 may link via a short-range connection, for example, via a Bluetooth connection, and still be able to communicate with each other.

If radios 102 are operating according to the LMR protocol, when radios 102 are in an area with inconsistent or no network coverage, two of the radios (for example, radios 102b and 102c) may be paired or linked via a short-range connection to serve as a repeater. For example, radios 102b and 102c may be paired according to the Bluetooth protocol using, for example, serial port profile (SPP), headset profile (HSP), hands free profile (HFP), advanced audio distribution profile (A2DP) or other Bluetooth profiles. One of radios 102b or 102c may be configured to serve as a default transmitter (also referred to herein as a slave radio) and the other radio may be configured to serve as a default receiver (also referred to herein as a master radio). For example, radio 102b may be configured to serve as the default receiver/master radio and radio 102c may be configured to serve as the default transmitter/slave radio. Once paired, a link is established between radios 102b and 102c. The link may be used to send audio, data, video, or control signals between radios 102b and 102c.

When, for example, radio 102a wants to transmit a signal associated with, for example, a LMR call, to one or more destination radios (for example, to radios 102d-102f), radio 102a sends the signal to each of radios 102b and 102c (i.e., the master and slave radios) on one LMR frequency (also referred to as a first LMR frequency) from a set of predefined LMR frequencies. The set of predefined LMR frequencies may include any LMR frequency used in direct mode, repeater mode, or talk around mode, and/or frequencies consistent with one or more LMR protocols such as TETRA or P25. One of the master or slave radios transmits the signal to the destination radios on another LMR frequency (also referred to as a second LMR frequency) from the set of predefined LMR frequencies. In order to prevent interference between a transmission frequency (i.e., the second LMR frequency) and a reception frequency (i.e., the first LMR frequency), instead of using a duplexer, the transmission frequency is isolated from the reception frequency by a distance, for example, by 20-40 feet. Accordingly, to isolate the transmission frequency and the reception frequency used for the signal sent from radio 102a, the master radio (i.e., radios 102b) is spaced at a distance from the slave radio (i.e., radio 102c), while maintaining the Bluetooth pairing.

Subsequent to receiving the signal sent from radio 102a on the first LMR frequency, each of radios 102b and 102c (i.e., the master and slave radios) measures the received signal strength. The slave radio (i.e., radio 102c) sends, via the one or more short-range frequencies, a Received Signal Strength Indicator (RSSI) for the signal received from radio 102a to the master radio (i.e., radio 102b). Based on the RSSI measured by radios 102b and 102c, radio 102b determines how the LMR call from radio 102a should be routed to the one or more destination radios via radios 102b or 102c. For example, if the RSSI measured by radio 102b is above a predefined RSSI threshold, then radio 102b then may transmit to radio 102c, via one or more short-range frequencies, a corresponding instruction indicating how the LMR call from radio 102a should be routed to the one or more destination radios. Radio 102b may also transmit the LMR call via the one or more short-range frequencies to radio 102c. For example, if the RSSI for the signal measured by radio 102b is above the predefined RSSI threshold, radio 102b may determine that it may serve as the receiver of the signal from radio 102a and radio 102b may transmit via one or more short-range frequencies, the LMR call and/or a corresponding instruction indicating that radio 102c is to transmit the signal sent from radio 102a on the second LMR frequency.

If the RSSI for the signal measured by radio 102b is not above the RSSI threshold, then radio 102b may compare its RSSI to the RSSI received from radio 102c to determine how the call received from radio 102a is to be routed. In some embodiments, the radio that measured the larger RSSI may serve as the receiver and the other radio may serve as the transmitter. For example, if the RSSI measured by radio 102b is less than the RSSI threshold but if the RSSI measured by radio 102b is greater than the RSSI measured by radio 102c, then radio 102b may serve as the receiver and radio 102c may serve as the transmitter of the call from radio 102a to the destination radios. Radio 102b then transmits, via one or more short-range frequencies, the LMR call and/or the instruction indicating that radio 102c is to transmit the signal sent from radio 102a (via radio 102b and via the short-range connection) on the second LMR frequency. In some embodiments when the slave radio receives the LMR call from the master radio via the short-range connection, the slave radio interprets this to mean that it needs to transmit the call on the second LMR frequency. Therefore in these embodiments, the slave radio does not need to receive separate instructions from the master radio indicating that the slave radio is to transmit the signal sent from the sending radio (for example, radio 102a) on the second LMR frequency.

On the other hand, if the RSSI for the signal measured by radio 102b is not above the RSSI threshold and if the RSSI measured by radio 102c is larger than the RSSI measured by radio 102b, then radio 102b may transmit corresponding instructions to radio 102c, via one or more short-range frequencies. The corresponding instructions indicate that the radio 102c is to receive the call from radio 102a on the first LMR frequency and send the call information to radio 102b via the one or more short-range frequencies. Radio 102b then transmits the signal sent from the radio 102a on the second LMR frequency.

As noted previously, to isolate the LMR transmission frequency from the LMR reception frequency, the master radio (i.e., radios 102b) is spaced at a distance from the slave radio (i.e., radio 102c), while maintaining the Bluetooth pairing. However, the RF link for the Bluetooth connection may not always be acceptable when the slave radio and the master radio are spaced at a fixed predetermined distance due, for example, to the location, structures and RF in an environment. Therefore, a Bluetooth link status provided by the master radio and/or slave radio may be used to determine an acceptable distance that the master radio and slave radio should be spaced apart from each other. If the master radio and the slave radio are spaced relatively close together, the Bluetooth link will be strong but this may not provide sufficient isolation between the LMR reception frequency and LMR transmission frequency. For example, for a class 2 Bluetooth device, if the master radio and the slave radio are spaced less than 25 feet apart, the RSSI level that correlates to less than 25 feet averages greater than −83 dB. This would yield 40 dB isolation at Ultra High Frequency (UHF) LMR frequencies such that the Bluetooth link will be strong but there may not be sufficient isolation between the LMR reception frequency and LMR transmission frequency. In this case, the master radio and/or the slave radio may provide an indication, for example, a "RED" LED indication, to advise that the space between the units is insufficient to isolate the LMR transmission and reception frequencies. As the distance between the master radio and the slave radio increases, the Bluetooth link will become weaker. When the master radio and the slave radio are spaced at a distance where the Bluetooth link strength correlates to acceptable separation between the master radio and the slave radio, the master radio and/or the slave radio may provide an indication, for example, a "GREEN" LED indication, indicating that the distance between the units is sufficient to isolate the LMR transmission and reception frequencies, while maintaining a sufficiently strong Bluetooth connection. The acceptable separation may be defined to be a separation where the RSSI level averages from −83 dB to −90 dB, inclusive. As the distance between the master radio and the slave radio increases beyond an acceptable separation threshold (for example, where the RSSI level averages less than −90 dB), the Bluetooth link would eventually become poor. Before this point is reached, the master radio and/or the slave radio may provide an indication, for example a "YELLOW" LED indication, indicating that the distance between the units is sufficient to isolate the LMR transmission and reception frequencies without maintaining a sufficiently strong Bluetooth connection.

Figure 2A:
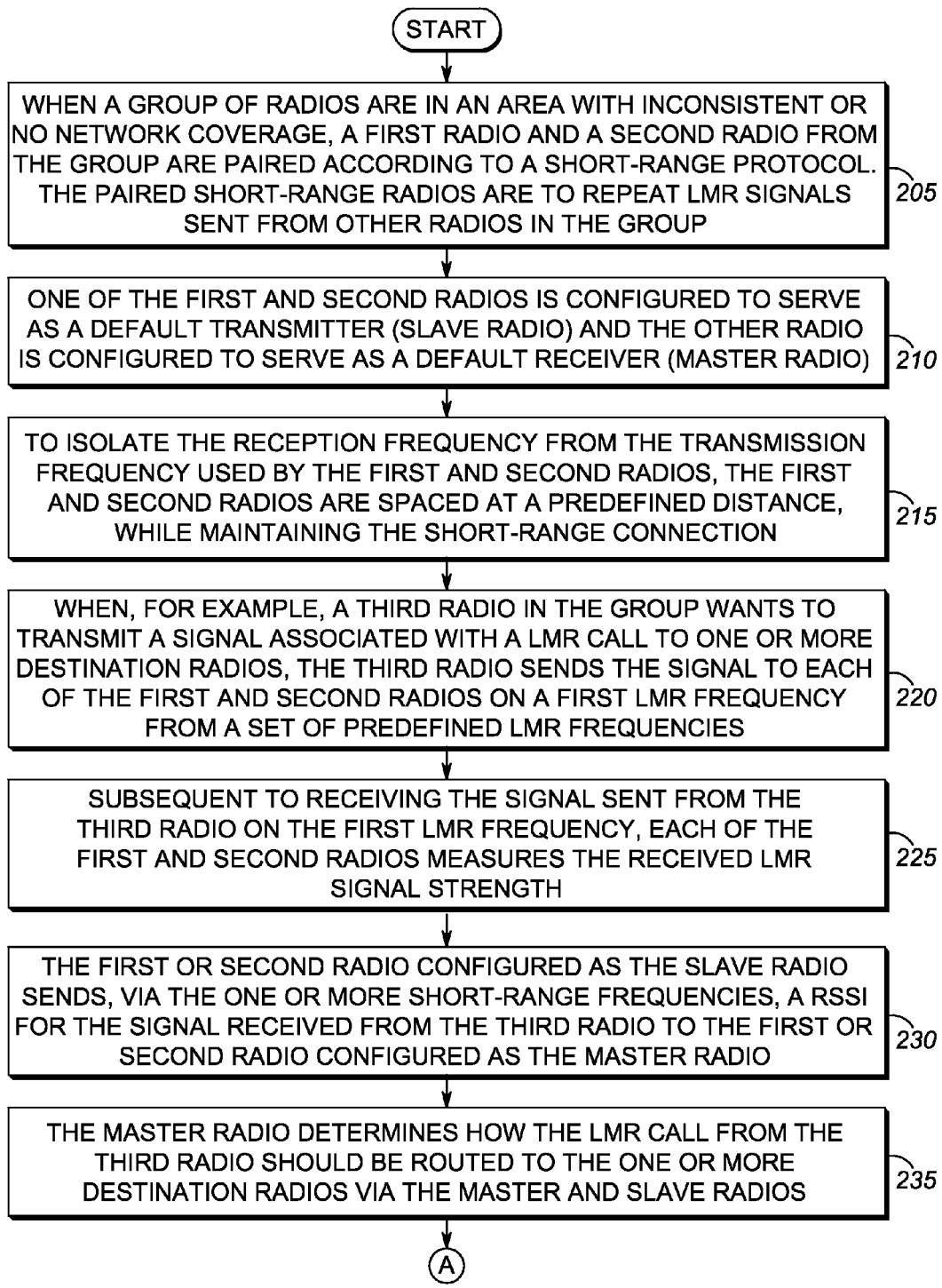
FIGS. 2A-2B set forth a flow diagram of the steps implemented in accordance with some embodiments.
Figure 2B:
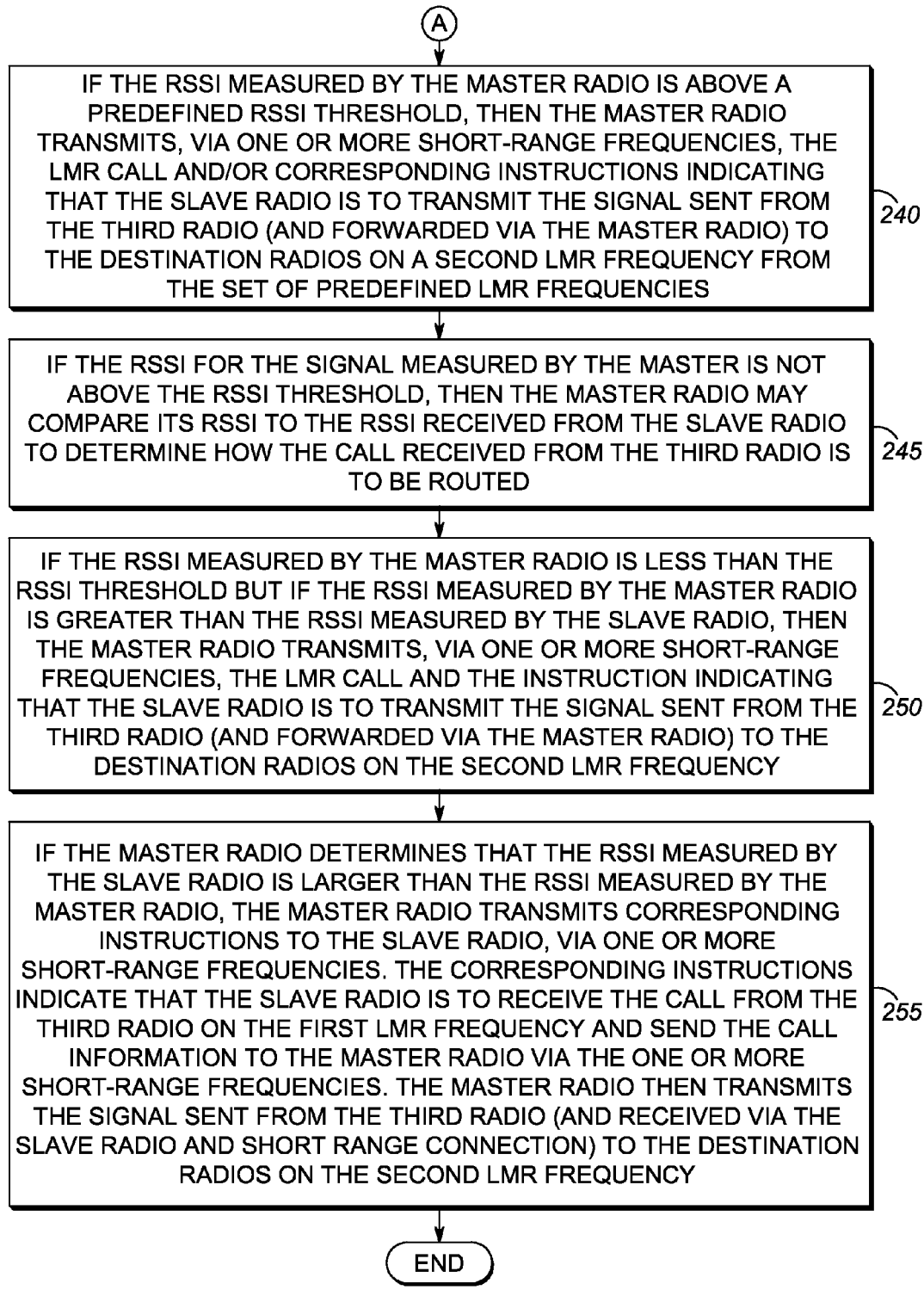

FIGS. 2A-2B set forth a flow diagram of the steps implemented in accordance with some embodiments. At 205 in FIG. 2A, when a group of radios are in an area with inconsistent or no network coverage, a first radio and a second radio from the group are paired according to a short-range protocol. The paired short-range radios are to repeat LMR signals sent from other radios in the group. At 210, one of the first and second radios is configured to serve as a default transmitter (slave radio) and the other radio is configured to serve as a default receiver (master radio). At 215, to isolate the reception frequency from the transmission frequency used by the first and second radios, the first and second radios are spaced at a distance, while maintaining the short-range connection. At 220 when, for example, a third radio in the group wants to transmit a signal associated with a LMR call to one or more destination radios, the third radio sends the signal to each of the first and second radios on a first LMR frequency from a set of predefined LMR frequencies.

At 225, subsequent to receiving the signal sent from the third radio on the first LMR frequency, each of the first and second radios measures the received LMR signal strength. At 230, the first or second radio configured as the slave radio sends, via the one or more short-range frequencies, a RSSI for the signal received from the third radio to the first or second radio configured as the master radio. At 235, the master radio determines how the LMR call from the third radio should be routed to the one or more destination radios via the master and slave radios. At 240 in FIG. 2B, if the RSSI measured by the master radio is above a predefined RSSI threshold, then the master radio transmits, via one or more short-range frequencies, the LMR call and/or corresponding instructions indicating that the slave radio is to transmit the signal sent from the third radio (and forwarded via the master radio) to the destination radios on a second LMR frequency from the set of predefined LMR frequencies.

At 245, if the RSSI for the signal measured by the master is not above the RSSI threshold, then the master radio may compare its RSSI to the RSSI received from the slave radio to determine how the call received from the third radio is to be routed. At 250, if the RSSI measured by the master radio is less than the RSSI threshold but if the RSSI measured by the master radio is greater than the RSSI measured by the slave radio, then the master radio transmits, via one or more short-range frequencies, the LMR call and/or the instructions indicating that the slave radio is to transmit the signal sent from the third radio (and forwarded via the master radio) to the destination radios on the second LMR frequency. In some embodiments when the slave radio receives the LMR call from the master radio via the short-range connection, the slave radio interprets this to mean that it needs to transmit the call to the destination radios on the second LMR frequency. Therefore in these embodiments, the slave radio does not need to receive separate instructions from the master radio indicating that the slave radio is to transmit the signal sent from the third radio. At 255, if the master radio determines that the RSSI measured by the slave radio is larger than the RSSI measured by the master radio, the master radio transmits corresponding instructions to the slave radio, via one or more short-range frequencies. The corresponding instructions indicate that the slave radio is to receive the call from the third radio on the first LMR frequency and send the call information to the master radio via the one or more short-range frequencies. The master radio then transmits the signal sent from the third radio (and received via the slave radio and short range connection) to the destination radios on the second LMR frequency.

Figure 3:
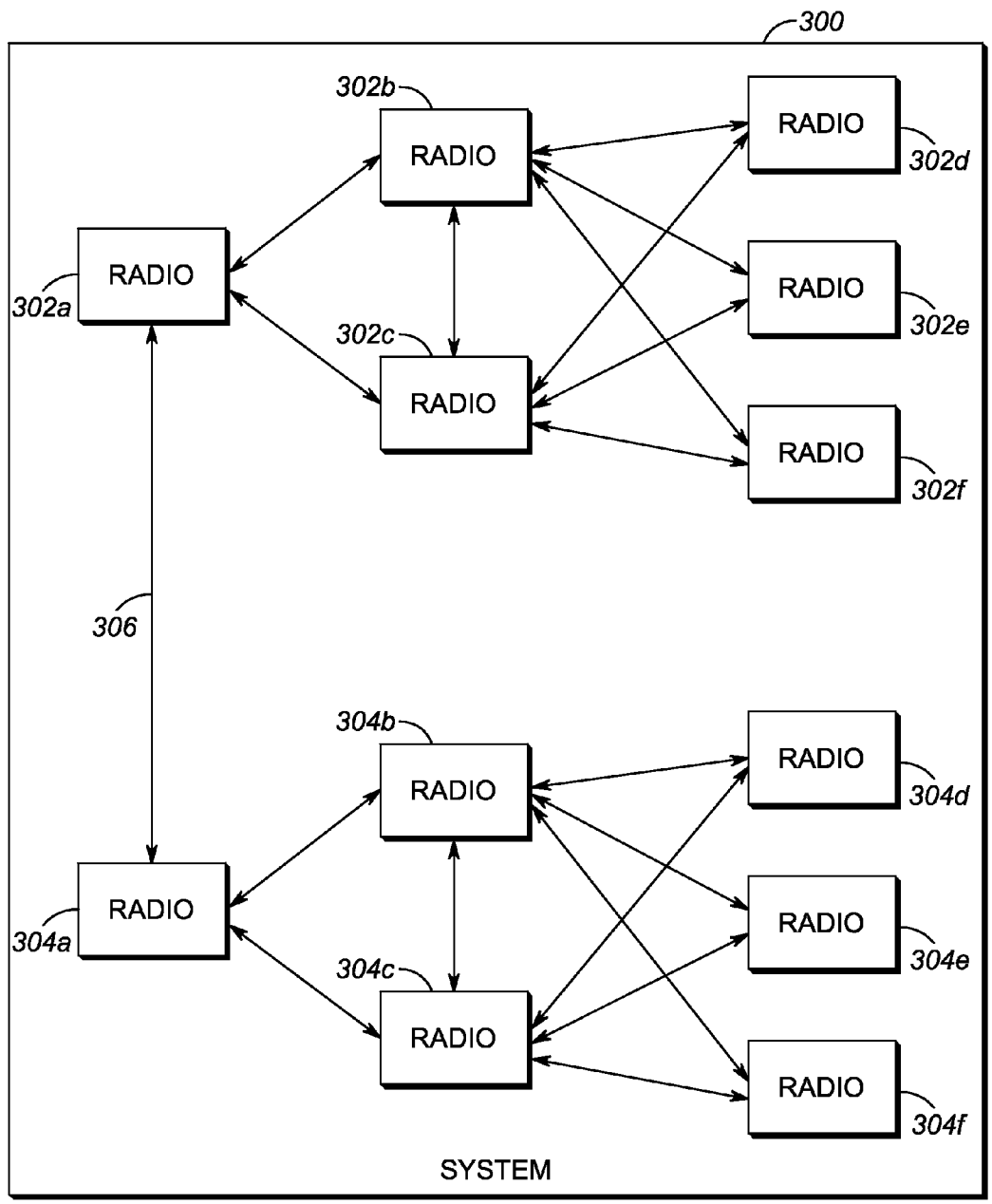
FIG. 3 is another block diagram of a system used in accordance with some embodiments.

FIG. 3 is another block diagram of a system used in accordance with some embodiments. System 300 includes radios 302 (i.e., radios 302a-302f) and radios 304 (i.e., radios 304a-304f). Radios 302 may operate according to a first wireless access network (WAN) technology or may operate on a first frequency band and radios 304 may operate according to a second WAN technology or may operate on a second frequency band. For example, radio 302 may operate on the Ultra High Frequency (UHF) band and radio 304 may operate on the Very High Frequency (VHF) band. In any case, radios 302 cannot communicate with radios 304 because they operate according to different protocols. Each of radio 302 and 304 may include one or more local area network or personal area network transceivers, such as a Bluetooth transceiver for short-range radio to radio communications.

Consider an example where a fire department is operating according to a first protocol and a police department is operating according to a second protocol. When an incident, such as a terrorist attack or another emergency occurs, personnel from both the fire department and the police department may respond to the incident. In order for the emergency service workers responding to the incident to communicate over the radios being used by those workers, a short-range connection is created between at least one radio in the first group and at least one radio being in the second group. For example, a Bluetooth connection 306 is created between a radio used by the fire department (for example, radio 302a) and a radio used by the police department (for example, radio 304a). It should be noted that short-ranged connections may be created between any numbers of devices in each group.

The radios connected by the short-range connection (for example, radio 302a and 304a) are spaced apart, for example, between twenty and thirty feet apart in order to isolate the LMR transmission frequency from the LMR reception frequency and prevent interference on the transmission and reception frequencies, while maintaining the short-ranged connection. One of the connected short-range radios may be preconfigured to receive and transmit signals on a first LMR frequency and the other of the connected short-range radios may be preconfigured to receive and transmit signals on a second LMR frequency. Subsequent to being connected, a signal sent from, for example, radio 302b may be received on the first LMR frequency by radio 302a. The received signal may then be translated to an audio, data, video, or control signal by radio 302 and sent from radio 302a to radio 304a via the Bluetooth connection 306. Radio 304a may then transmit the audio, data, video, or control signal to other radios, for example radio 304b-304f on the second LMR frequency. Therefore, some embodiments provide the capability to increase the coverage areas of the radios, wherein by linking, for example, radios 302 and 304, the coverage for radios 302 extends to radios 304 and vice versa. In addition, some embodiments provide the capability for cross talk between different groups. For example, if radios 302 are operating on a UHF band and radios 304 are operating on the VHF band, radios 302 and 304 may communicate with each other by linking one radio from the first group with another radio from the second group with a short-range protocol.

Figure 4:
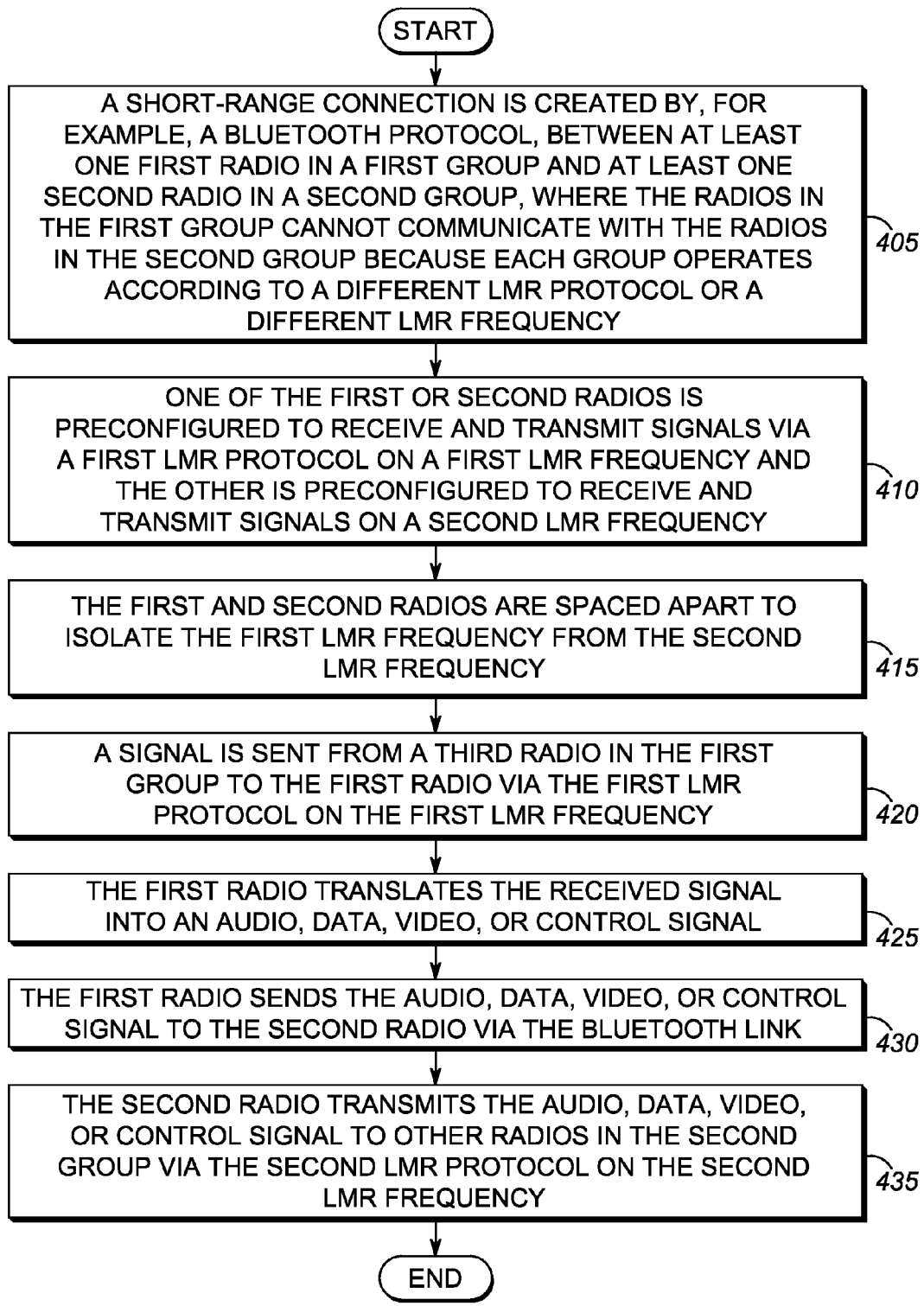
FIG. 4 is another flow diagram of the steps implemented in accordance with some embodiments.

FIG. 4 is another flow diagram of the steps implemented in accordance with some embodiments. At 405, a short-range connection is created by, for example, a Bluetooth protocol, between at least one first radio in a first group and at least one second radio in a second group, where the radios in the first group cannot communicate with the radios in the second group because each group operates according to a different LMR protocol or a different LMR frequency. At 410, one of the first or second radios is preconfigured to receive and transmit signals via a first LMR protocol on a first LMR frequency and the other is preconfigured to receive and transmit signals via a second LMR protocol on a second LMR frequency. At 415, the first and second radios are spaced apart to isolate the first LMR frequency from the second LMR frequency. At 420, a signal is sent from a third radio in the first group to the first radio via the first LMR protocol on the first LMR frequency. At 425, the first radio translates the received signal into an audio, data, video, or control signal. At 430, the first radio sends the audio, data, video, or control signal to the second radio via the Bluetooth link. At 435, the second radio transmits the audio, data, video, or control signal to other radios in the second group via the second LMR protocol on the second LMR frequency.

Figure 5:
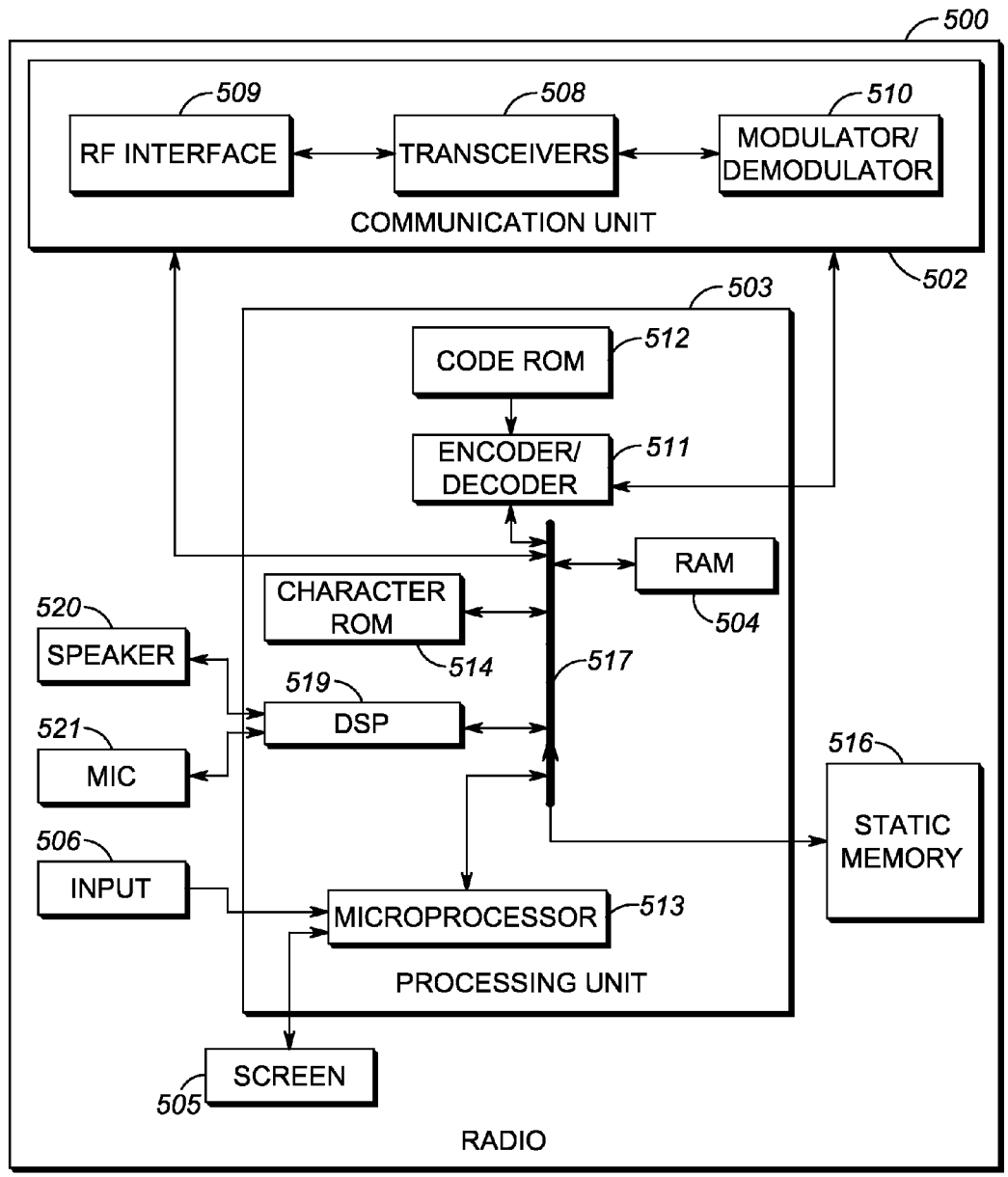
FIG. 5 is a block diagram of a radio used in accordance with some embodiments.

FIG. 5 is a block diagram of a radio used in accordance with some embodiments. Radio 500 includes a communications unit 502 coupled to a common data and address bus 517 of a processing unit 503. The radio 500 may also include an input unit (e.g., keypad, pointing device, etc.) 506, an output transducer unit (e.g., speaker) 520, an input transducer unit (e.g., a microphone) (MIC) 521, and a display screen 505, each coupled to be in communication with the processing unit 503.

The processing unit 503 may include an encoder/decoder 511 with an associated code ROM 512 for storing data for encoding and decoding voice, data, control, or other signals that may be transmitted or received by the radio 500. The processing unit 503 may further include a microprocessor 513 coupled, by the common data and address bus 517, to the encoder/decoder 511, a character ROM 514, a RAM 504, and a static memory 516. The processing unit 503 may also include a digital signal processor (DSP) 519, coupled to the speaker 520, the microphone 521, and the common data and address bus 517, for operating on audio signals received from one or more of the communications unit 502, the static memory 516, and the microphone 521.

The communications unit 502 may include an RF interface 509 configurable to communicate with network components, and other user equipment within its communication range. The communications unit 502 may include one or more broadband and/or narrowband transceivers 508, such as an Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver perhaps operating in accordance with an IEEE 802.16 standard, and/or other similar type of wireless transceiver configurable to communicate via a wireless network for infrastructure communications. The communications unit 502 may also include one or more local area network or personal area network transceivers such as Wi-Fi transceiver perhaps operating in accordance with an IEEE 802.11 standard (e.g., 802.11a, 802.11b, 802.11g), or a Bluetooth transceiver, for subscriber device to subscriber device communications. The transceivers may be coupled to a combined modulator/demodulator 210 that is coupled to the encoder/decoder 511. The character ROM 514 stores code for decoding or encoding data such as control, request, or instruction messages, channel change messages, and/or data or voice messages that may be transmitted or received by the radio. Static memory 516 may store operating code associated with establishing the Bluetooth connection and extending the radio coverage range and for performing one or more of the steps set forth in FIGS. 2A-2B and 4.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
    receiving, via a first land mobile radio (LMR) radio frequency (RF) transceiver at a first short-range paired radio, a first transmission of an LMR call from a source transmitting radio on a first LMR frequency for re-transmission to one or more destination radios;
    measuring, at the first short-range paired radio, a first measured signal level of the first transmission transmitted by the source transmitting radio;
    receiving, at the first short-range paired radio via a first short-range RF transceiver and from a second short-range paired radio, a second measured signal level of the first transmission transmitted by the source transmitting radio as measured by the second short-range paired radio;
    comparing, by the first short-range paired radio, the first measured signal level and the second measured signal level;
    determining, by the first short-range paired radio based on the comparing, how the LMR call should be routed from the source transmitting radio to the one or more destination radios via the first and second short-range paired radios; and
    transmitting, via the first short-range RF transceiver at the first short-range paired radio, a corresponding instruction indicating a result of the determining to the second short-range paired radio.

2. The method of claim 1, wherein the step of determining how the LMR call should be routed, via the first and second short-range paired radios, comprises determining whether the LMR call should be (i) received on the first LMR frequency by the first short-range paired radio, provided from the first short-range paired radio to the second short-range paired radio via one or more short-range RF frequencies, and re-broadcast on a second LMR frequency by the second short-range paired radio, or (ii) received on the first LMR frequency by the second short-range paired radio, provided from the second short-range paired radio to the first short-range paired radio via one or more short-range RF frequencies, and re-broadcast on the second LMR frequency by the first short-range paired radio.

3. The method of claim 1, further comprising isolating the first LMR frequency from a second LMR frequency by spacing the first short-range paired radio at a distance from the second short-range paired radio while maintaining a short-ranged connection between the first short-range paired radio and the second short-range paired radio.

4. The method of claim 1, further comprising identifying one of the first short-range paired radio and the second short-range paired radio as a master radio, wherein the master radio is a default receiver of the first transmission transmitted by the source transmitting radio.

5. The method of claim 1, wherein the determining comprises comparing the first measured signal level against a predefined threshold and determining that the LMR call should be received on the first LMR frequency by the first short-range paired radio, provided from the first short-range paired radio to the second short-range paired radio via one or more short-range RF frequencies, and re-broadcast on a second LMR frequency by the second short-range paired radio, if the first measured signal level is greater than the predefined threshold.

6. The method of claim 1, wherein the determining comprises determining that the LMR call should be received on the first LMR frequency by the first short-range paired radio, provided from the first short-range paired radio to the second short-range paired radio via one or more short-range RF frequencies, and re-broadcast on a second LMR frequency by the second short-range paired radio, if the first measured signal level is greater than the second measured signal level.

7. The method of claim 1, wherein the determining comprises determining that the LMR call should be received on the first LMR frequency by the second short-range paired radio, provided from the second short-range paired radio to the first short-range paired radio via one or more short-range RF frequencies, and re-broadcast on a second LMR frequency by the first short-range paired radio if the first measured signal level is less than the second measured signal level.

8. The method of claim 1, wherein the first short-range paired radio and the second short-range paired radio are paired according to a Bluetooth protocol using at least one Bluetooth profile.

9. The method of claim 1, further comprising providing on at least one of the first short-range paired radio and the second short-range paired radio a Bluetooth link status indicator to indicate an optimum distance that the first short-range paired radio and the second short-range paired radio should be spaced apart from each other to isolate the first LMR frequency from a second LMR frequency, while maintaining a short-ranged connection between the first short-range paired radio and the second short-range paired radio.

10. The method of claim 9, wherein the Bluetooth link status indicator provides an indication when:
the first short-range paired radio and the second short-range paired radio are spaced at a distance that does not provide sufficient isolation between the first LMR frequency from the second LMR frequency, while maintaining a short-ranged connection between the first short-range paired radio and the second short-range paired radio,
the first short-range paired radio and the second short-range paired radio are spaced at a distance that provides sufficient isolation between the first LMR frequency from the second LMR frequency, while maintaining the short-ranged connection between the first short-range paired radio and the second short-range paired radio, or
the first short-range paired radio and the second short-range paired radio are spaced at a distance that provides sufficient isolation between the first LMR frequency from the second LMR frequency without maintaining the short-ranged connection between the first short-range paired radio and the second short-range paired radio.

11. The method of claim 1, further comprising:
determining, responsive to receiving the second measured signal, whether the second short-range paired radio received the first transmission; and
the transmitting the corresponding instruction comprises transmitting the corresponding instruction indicating the result to the second short-range paired radio, responsive to determining that the second short-range paired radio did not receive the first transmission.

12. A short-ranged paired radio comprising:
a memory;
a first land mobile radio (LMR) radio frequency (RF) transceiver;
a first short-range RF transceiver;
a processor configured to:
receive, via the first LMR RF transceiver, a first transmission of an LMR call from a source transmitting radio on a first LMR frequency;
measure a first measured signal level of the first transmission transmitted by the source transmitting radio;
receive, via the first short-range RF transceiver from a second short-range paired radio, a second measured signal level of the first transmission transmitted by the source transmitting radio as measured by the second short-range paired radio;
compare the first measured signal level and the second measured signal level, and determine, based on the comparison, how the LMR call should be routed from the source transmitting radio to one or more destination radios via the first and second short-range paired radios; and
transmit, via the first short-range RF transceiver, a corresponding instruction to the second short-range paired radio, wherein the instruction indicates how the LMR call should be routed from the source transmitting radio to the one or more destination radios via the first and second short-range paired radios.

13. The short-ranged paired radio of claim 12, wherein the processor is configured to determine whether the LMR call should be (i) received on the first LMR frequency by the short-range paired radio, provided from the short-range paired radio to the second short-range paired radio via the short-range RF transceiver and one or more short-range RF frequencies, and re-broadcast on a second LMR frequency by the second short-range paired radio, or (ii) received on the first LMR frequency by the second short-range paired radio, provided from the second short-range paired radio to the short-range paired radio via one or more short-range RF frequencies, and re-broadcast on the second LMR frequency by the short-range paired radio.

14. The short-ranged paired radio of claim 12, wherein the first LMR frequency is isolated from a second LMR frequency by spacing the short-range paired radio at a distance from the second short-range paired radio while maintaining a short-ranged connection between the first short-range paired radio and the second short-range paired radio.

15. The short-ranged paired radio of claim 12, wherein the processor is further configured to identify one of the short-range paired radio and the second short-range paired radio as a master radio, wherein the master radio is a default receiver of the first transmission transmitted by the source transmitting radio.

16. The short-ranged paired radio of claim 12, wherein the processor is configured to compare the first measured signal level against a predefined threshold and determine that the LMR call should be received on the first LMR frequency by the short-range paired radio, provided from the short-range paired radio to the second short-range paired radio via the short-range RF transceiver and one or more short-range RF frequencies, and re-broadcast on a second LMR frequency by the second short-range paired radio, if the first measured signal level is greater than the predefined threshold.

17. The short-ranged paired radio of claim 12, wherein the processor is further configured to determine that the LMR call should be received on the first LMR frequency by the short-range paired radio, provided from the short-range paired radio to the second short-range paired radio via the short-range RF transceiver and one or more short-range RF frequencies, and re-broadcast on a second LMR frequency by the second short-range paired radio, if the first measured signal level is greater than the second measured signal level.

18. The short-ranged paired radio of claim 12, wherein the processor is further configured to determine that the LMR call should be received on the first LMR frequency by the second short-range paired radio, provided from the second short-range paired radio to the short-range paired radio via the short-range RF transceiver and one or more short-range RF frequencies, and re-broadcast via the LMR RF transceiver on a second LMR frequency by the short-range paired radio if the first measured signal level is less than the second measured signal level.

19. The short-ranged paired radio of claim 12, wherein the first short-range RF transceiver is configured to pair the short-range paired radio according to a Bluetooth protocol.

20. The short-ranged paired radio of claim 12, further comprising a Bluetooth link status indicator to indicate an optimum distance that the short-range paired radio and the second short-range paired radio should be spaced apart from each other to isolate the first LMR frequency from a second LMR frequency, while maintaining a short-ranged connection between the short-range paired radio and the second short-range paired radio, wherein the Bluetooth link status indicator provides an indication when:

the first short-range paired radio and the second short-range paired radio are spaced at a distance that does not provide sufficient isolation between the first LMR frequency from the second LMR frequency, while maintaining the short-ranged connection between the first short-range paired radio and the second short-range paired radio, the first short-range paired radio and the second short-range paired radio are spaced at a distance that provides sufficient isolation between the first LMR frequency from the second LMR frequency, while maintaining the short-ranged connection between the first short-range paired radio and the second short-range paired radio, or the first short-range paired radio and the second short-range paired radio are spaced at a distance that provides sufficient isolation between the first LMR frequency from the second LMR frequency without maintaining the short-ranged connection between the first short-range paired radio and the second short-range paired radio.

* * * * *

UNITED STATES PATENT AND TRADEMARK OFFICE
CERTIFICATE OF CORRECTION

| | | |
|---|---|---|
| PATENT NO. | : 9,060,243 B2 | Page 1 of 1 |
| APPLICATION NO. | : 13/967496 | |
| DATED | : June 16, 2015 | |
| INVENTOR(S) | : Wayne M. Phang et al. | |

It is certified that error appears in the above-identified patent and that said Letters Patent is hereby corrected as shown below:

IN THE TITLE PAGE:

(71), under "Applicant," in Column 1, Line 1, delete "INC," and insert -- INC., --, therefor.

(72), under "Inventors," in Column 1, Line 1, delete "Wayne M" and insert -- Wayne M. --, therefor.

(72), under "Inventors," in Column 1, Line 2, delete "Shakeeb Z" and insert -- Shakeeb Z. --, therefor.

IN THE SPECIFICATION:

In Column 8, Line 7, delete "(3GGP or 3GGP2)" and insert -- (3GPP or 3GPP2) --, therefor.

Signed and Sealed this
Thirty-first Day of May, 2016

Michelle K. Lee
*Director of the United States Patent and Trademark Office*